United States Patent [19]

Sivavec

[11] Patent Number: 5,750,036

[45] Date of Patent: May 12, 1998

[54] COMPOSITION AND METHOD FOR GROUND WATER REMEDIATION

[75] Inventor: Timothy Mark Sivavec, Clifton Park, N.Y.

[73] Assignee: General Electric Company, Schenectady, N.Y.

[21] Appl. No.: 636,005

[22] Filed: Apr. 22, 1996

[51] Int. Cl.$^6$ .................................................. C02F 1/70
[52] U.S. Cl. .......................... 210/747; 210/757; 210/908; 405/128
[58] Field of Search ..................... 210/170, 747, 210/757, 758, 908; 405/128

[56] References Cited

U.S. PATENT DOCUMENTS

| | | | |
|---|---|---|---|
| 3,640,821 | 2/1972 | Sweeny et al. | 210/59 |
| 4,321,158 | 3/1982 | Beall et al. | 405/128 |
| 4,637,992 | 1/1987 | Lewis et al. | 502/84 |
| 5,068,038 | 11/1991 | Fischer et al. | 210/908 |
| 5,266,213 | 11/1993 | Gillham | 210/747 |
| 5,362,404 | 11/1994 | Haitko | 210/757 |
| 5,447,639 | 9/1995 | Sivavec | 210/747 |
| 5,520,483 | 5/1996 | Vigneri | 210/759 |

*Primary Examiner*—Peter A. Hruskoci
*Assistant Examiner*—Betsey J. Morrison
*Attorney, Agent, or Firm*—James Magee, Jr.

[57] ABSTRACT

Addition of ferrous ions to clay and ferric minerals in the ground creates in situ reactive zones which dehalogenate halogenated contaminants in ground water flowing through the reactive zone.

8 Claims, No Drawings

COMPOSITION AND METHOD FOR GROUND WATER REMEDIATION

This invention is directed to reductive dehalogenation of halogenated organic compounds and particularly to treatment of soils, ground water, aquifer materials, and sediments contaminated with such compounds. More particularly the invention relates to remediation of soils, sediments, and aquifer materials which are contaminated with water miscible halogenated organic solvents

BACKGROUND OF THE INVENTION

Polychlorinated hydrocarbons, such as carbon tetrachloride, chloroform, trichloroethylene, and tetrachloroethylene have been widely used as chemical intermediates, solvents for dry cleaning of clothing, in degreasing operations, and in a variety of other industrial applications. Chlorinated hydrocarbons are very stable compounds and are relatively toxic at low levels and are very soluble in water. Ground waters have become contaminated by chlorinated hydrocarbons from sources such as disposal facilities, chemical spills, and leaking underground storage tanks.

Although use of such materials has been reduced, improper storage and disposal practice has resulted in substantial contamination of ground waters and aquifers and the chlorinated hydrocarbons have been accumulating in the environment. Pollution of water by chlorinated hydrocarbons is an important environmental problem and contaminated ground waters represent a large portion of environmental remedial action plans throughout the world.

A common remediation treatment for ground water contaminated with chlorinated hydrocarbons involves pumping the water out of the well or aquifer, volatizing the contaminants in an air stripping tower, and returning the decontaminated water to the ground site. The contaminants in the vapor phase are adsorbed onto activated carbon for further processing.

It is known that chlorinated compounds can be rendered less toxic by reductive dechlorination, i.e., by replacement of chlorine substituents by hydrogen. Zero valent metals, such as iron, have been emplaced in the ground in the form of a porous wall in a ground water flow path. As the water-borne contaminants flow through the wall the active metal dehalogenates the organic compounds.

The disadvantage of the wall method lies in the difficulty of introducing large volumes of solid reactive material, such as iron particles, at effective depths. Conventional excavation methods generally limit the practical working depth to about 30 feet; whereas ground water contaminants are found at depths as great as 300 feet.

The above-mentioned metal systems function by the reductive dechlorination of hydrocarbons in aqueous solutions. They are disadvantaged in that large amounts of active metal is required to provide sufficient contact time for completion of the reactions.

There is still a need for remediation processes to effectively clean-up waters contaminated with chlorinated hydrocarbons.

A method for selectively generating or forming reactive dehalogenation zones at the required depth is needed.

SUMMARY OF THE INVENTION

Practice of this invention provides for the formation of reactive zones in which reductive dehalogenation of halogenated organic contaminants in subsurface environments, such as ground water, soils, sediments, and aquifer materials, takes place. Reductive dehalogenation of the halogenated hydrocarbon is achieved by contacting the hydrocarbon with a composition comprising ferrous ions and a clay or ferric-($Fe^{3+}$) containing minerals.

In a principal embodiment of the process of this invention, reactive zones are formed, in-situ, within a subsurface ferric mineral or clay-containing region by introducing ferrous ions which coordinate or chelate with the clay or ferric ion-containing mineral. Coordination of ferrous ion with the mineral has been found to reduce the redox potential of the system, thereby substantially increasing reactivity with the halogenated organic contaminants.

Ferrous modified clay and ferric minerals can be formed and utilized in-situ and can be combined with various geotextile materials for use as landfill liners and ground covers.

DESCRIPTION OF THE INVENTION

This invention relates to a method for degradation of contaminants from ground water as these contaminants migrate in an aquifer, landfill or in other subsurface environments. It also relates to the interception and destruction of contaminants as they are released from subsurface environments. The release may be caused by thermal, electrokinetic, or volatization processes. More specifically, the process provides a means for the reductive dehalogenation of halogenated solvents by contacting said halogenated hydrocarbons with clay minerals and iron(III)-containing soils, sediments and aquifer materials that have been treated with ferrous ion.

The ground water remediation methods and compositions of this invention can be applied to treatment of water contaminated with a variety of water miscible or soluble halogenated organic compounds. Chlorinated solvents are a particularly common contaminant in aquifers and other subsurface water containing environments. Trichloroethylene (TCE), dichloroethylene (DCE), vinyl chloride (VC), tetrachloroethylene, dichloroethane, trichloroethane, carbon tetrachloride, chloroform, and dichloromethane are illustrative examples.

Halogenated hydrocarbon compounds that may be treated include tetrachloroethylene, trichloroethylene, dichloroethylene, vinyl chloride, trichloroethane, dichloroethane, chloroethane, carbon tetrachloride, chloroform, dichloromethane and methyl chloride, brominated methanes, brominated ethanes, brominated ethenes, fluorinated methanes, fluorinated ethanes, fluorinated ethenes, fluorochloromethanes, fluorochloroethanes and fluorochloroethenes.

These chemicals are very toxic even in small concentrations and constitute a real environmental hazard.

Ferrous ion may be introduced into clay minerals, clay-bearing soils or sediments, iron(III) minerals and iron(III)-bearing soils or sediments by a variety of methods. Examples of methods which can be so used include (1) direct treatment of the contaminated material with ferrous ion in aqueous solution, (2) dissolution of ferrous ion provided by the interaction of iron-bearing minerals with organic and inorganic reducing agents, (3) dissolution of ferrous ion resulting from iron metal corrosion, (4) dissolution of ferrous ion formed by electrolytic processes at iron electrodes, and (5) dissolution of ferrous ion produced by stimulation and growth of iron-reducing bacteria in iron-containing substrates such as soil, sediment, and the like.

Injection wells may be used to pump aqueous ferrous ion containing compositions to great depths to generate strategically placed reactive zones. Migrating plumes of ground water contaminated with halogenated hydrocarbons may then be intercepted by these reactive zones, thereby stopping the flow of the contaminants. This technique provides an effective means to control and prevent the migration of water miscible contaminants from a contaminated area.

Organic and inorganic reductants may also be used to solubilize ferrous ion from iron-bearing soils, sediments and aquifer materials. Examples of organic reductants include organic acids such as formic acid, acetic acid, propionic acid, malonic acid, oxalic acid, malic acid, adsorbic acid, succinic acid, citric acid, lactic acid and EDTA. Salts of organic acids may also be used as organic reductants. Examples include sodium formate, sodium acetate, sodium malonate, sodium oxalate, sodium ascorbate, sodium lactate, sodium citrate and sodium EDTA. Examples of inorganic reductants that may be used to solubilize ferrous ion from iron-bearing soils, sediments, and aquifer materials include sodium dithionite and sodium bisulfite.

Natural hydraulic gradients transport organic contaminants to the modified clay zones, where degradation of the contaminants occurs to remove them from the flowing water. Permeable treatment walls may be used for perimeter control of a contaminated site as an alternative for costly pump-and-treat systems.

Iron-modified clays may be prepared ex-situ by contacting, after excavation, silicate clays with ferrous ion in aqueous solution. These modified clays may then be used as landfill liners, soil covers and as treatment zones in electro-osmotic remediation processes. They may be covered in geotextile fabrics to facilitate handling and placement.

Contaminants that may be effectively treated include halogenated solvents such as PCE, TCE, DCE, VC, trichloroethane, dichloroethane, chloroethane, carbon tetrachloride, chloroform, dichloromethane and methyl chloride. Other classes of contaminants that may be effectively treated include brominated methanes, brominated ethanes, brominated ethenes, fluorinated methanes, fluorinated ethanes, fluorinated ethenes, fluorochloromethanes, fluorochloroethanes and fluorochloroethenes.

The degradation of chlorinated solvents occurs by a reductive dechlorination mechanism in which the reduction of carbon-chlorine bonds is coupled to the oxidation of Fe(II) to Fe(III) at the clay-bound ferrous-water interface. TCE, DCE and VC, for example, are reduced fully to ethene, ethane, ethyne and chloride. DCE and VC are intermediate products of TCE, but these intermediate products are also reduced in time to ethene, ethane, ethyne and chloride.

Examples of clays which can be modified with the ferrous ion and used in accordance with this invention include kandites or kaolinites, smectites, vermiculites, and chlorites.

Suitable ferric, i.e., iron(III) minerals which can be mixed with the ferrous ion include: magnetite, goethite, hematite, maghemite, ferihydrite, and lepidocricite.

EXAMPLE 1

Batch Reaction with Fe(II)-Modified Kaolin Clay

The following examples demonstrate that ferrous ion addition to aluminosilicate clays generates a reducing environment in which halogenated hydrocarbons are degraded to hydrocarbon products and chloride. The control reactions show that no degradation of TCE takes place in the absence of added ferrous ion.

To eight 120 mL borosilicate glass vials was added 15.0 g kaolinite clay. Chemical analysis indicated 45.0 wt. % $SiO_2$, 38.0% $Al_2O_3$, 1.54% $TiO_2$, 0.77% $Fe_2O_3$, 0.04% CaO, 0.08% MgO, 0.51% $K_2O$, 0.06% $Na_2O$. Its physical properties were as follows: 2.0% moisture, pH at 20% solids 4.5–5.5, median particle diameter 0.75 µm.

Milli-Q-filtered, deionized water was filter-sterilized (0.2 µm) and made anaerobic by purging with 99.999% nitrogen. All transfers of water was conducted within an anaerobic chamber. Trichloroethylene (TCE) was added to the nitrogen-purged water to afford a 1.85 mg/L TCE solution. Four control vials were filled to capacity with 115 mL of this solution. There was no headspace in the filled vials. Iron(II) sulfate heptahydrate was added to the remaining solution to afford a 100 mM iron (II) sulfate/1.8 mg/L TCE solution. Four reaction vials were filled with 115 mL of this solution. There was no headspace in these vials. The pH of these solutions measured 5.5 due to the buffering capacity of the clay. Measurement of pH was conducted using a Ross Sure-Flow pH combination electrode, standardized with pH 4 and 7 buffers.

The eight vials were capped with Teflon-lined septa, sealed with an aluminum crimp cap and the contents were mixed by rotation on a jar mill set at 35 rpm. All experiments were conducted at ambient temperature (approx. 25° C.).

After 6, 24, 48 and 120 h, the vials were removed from the jar mill and were allowed to rest to allow the contents to settle. Aliquots (5.0 mL) of the aqueous solution were removed from the vials at these sample times using a 10 mL gas-tight syringe and positive nitrogen pressure introduced via an 18 gauge 1.5 in. bevel-tipped needle. The water samples (5.0 mL) were sampled on a Tekmar purge-and-trap concentrator (with autosampler) interfaced with a gas chromatograph equipped with a flame ionization detector (Tekmar ALS 2016 autosampler (method 8: U.S. EPA 601/ 624); Tekmar 3000 purge-and-trap concentrator and Hewlett Packard 5890 series II gas chromatograph). A Hewlett Packard HP-624 capillary (30 m, 0.53 mm i.d., 3 µm film thickness) was used. The following GC temperature program was used: 40° C. for 5 min., 10° C./min. to 180° C., 180° C. for 10 min. TCE, cis-DCE, 1,1-DCE and VC standards ranging from 1 µg/L to 25,000 µg/L were used to calibrate the GC-FID response.

The aqueous phase was also analyzed for hydrocarbon gaseous products by purge-and-trap GC-FID using a second Tekmar purge-and-trap concentrator interfaced with a gas chromatograph equipped with a flame ionization detector.

Tekmar 3000 purge-and-trap concentrator and Hewlett Packard 5890 series II gas chromatograph). A PLOT fused silica $Al_2O_3/Na_2SO_4$ analytical column supplied by Chrompack, Inc. (50 m, 0.32 mm i.d., 0.45 mm o.d., 5 µm film thickness) was used to achieve separation of C1–C6 hydrocarbon gases. The following GC temperature program was used: 75° C. for 5 min, 20° C./min to 120° C., 120° C. for 30 min.

Samples of the settled aqueous phase (5.0 mL) were withdrawn by gas-tight syringe and loaded directly onto the Tekmar 2016 autosampler. Ethane, ethene, ethyne, propane, propene and seven C4 hydrocarbons (isobutane, n-butane, trans-2-butene, 1-butene, isobutene, cis-2-butene, 1,3-butadiene) were calibrated from 1% mixtures in nitrogen (Scott Specialty gases) by a direct injection method. Ten volumes of the 1% gas mixtures (5 µl to 500 µL) were used to generate calibration curves for each of the 12 hydrocarbon products.

The results of the batch experiments are summarized below in Tables 1 and 2.

TABLE 1

Reductive Dechlorination of TCE with
Kaolinite Clay Amended with 100 mM Ferrous Sulfate

| time h | [TCE] mg/L | C/Co | ethane, ethene and ethyne as equiv. TCE | pH |
|---|---|---|---|---|
| 0 | 1.85 | 1.00 | — | 5.5 |
| 6 | 1.33 | 0.72 | 0.85 | 5.6 |
| 24 | 1.11 | 0.60 | 0.89 | 5.6 |
| 48 | 0.15 | 0.08 | 0.91 | 5.6 |
| 120 | 0.04 | 0.02 | 0.95 | 5.6 |

TABLE 2

Control Reactions with Kaolinite Clay
Demonstrating No Reaction in the Absence of Ferrous Sulfate

| time h | [TCE] mg/L | C/Co | ethane, ethene and ethyne as equiv. TCE | pH |
|---|---|---|---|---|
| 0 | 1.85 | 1.00 | — | 5.5 |
| 6 | 1.72 | 0.93 | n.d. | 5.5 |
| 24 | 1.78 | 0.96 | n.d. | 5.5 |
| 48 | 1.80 | 0.97 | n.d. | 5.5 |
| 120 | 1.65 | 0.89 | n.d. | 5.5 | n.d.: nondetect by purge-and-trap GC-FID

Tables 2A and 2B are two series of control experiments which demonstrates the lack of reaction between ferrous ion and TCE in solution when there is no binding (chelation) of ferrous ion to the substrate.

TABLE 2A

Control Experiment Demonstrating
No Reductive Dechlorination of TCE in the
Presence of 100 mM Aqueous Ferrous Sulfate,
No Buffer, Anaerobic Conditions

| time h | [TCE] mg/L | C/Co | ethane, ethene and ethyne as equiv. TCE | pH |
|---|---|---|---|---|
| 0 | 1.85 | 1.00 | — | 3.5 |
| 6 | 1.75 | 0.94 | n.d. | 3.6 |
| 24 | 1.84 | 0.99 | n.d. | 3.6 |
| 48 | 1.79 | 0.97 | n.d. | 3.6 |
| 120 | 1.86 | 1.00 | n.d. | 3.6 | n.d.: nondect by purge-and-trap GC-FID

TABLE 2B

Control Experiment Demonstrating
No Reductive Dechlorination of TCE in the
Presence of 100 mM Aqueous Ferrous Sulfate,
Buffered with 50 mM TRIS, Anaerobic Conditions

| time h | [TCE] mg/L | C/Co | ethane, ethene and ethyne as equiv. TCE | pH |
|---|---|---|---|---|
| 0 | 1.85 | 1.00 | — | 7.8 |
| 6 | 1.78 | 0.94 | n.d. | 7.8 |
| 24 | 1.80 | 0.99 | n.d. | 7.7 |
| 48 | 1.79 | 0.97 | n.d. | 7.7 |
| 120 | 1.76 | 1.00 | n.d. | 7.6 | n.d.: nondect by purge-and-trap GC-FID
TRIS: tris(hydroxymethyl)aminomethane

EXAMPLE 2

Batch Reaction with Fe(II)-Modified Magnetite

The following examples demonstrate that ferrous ion addition to an iron (III) mineral, magnetite, generates a reducing environment in which halogenated hydrocarbons are degraded to hydrocarbon products and chloride. The control reactions show that no degradation of TCE takes place in the absence of added ferrous ion.

To eight 120 mL borosilicate glass vials was added 25.0 g magnetite, $Fe_3O_4$. The magnetite was identified by X-ray diffraction. Milli-Q-filtered, deionized water was filter-sterilized (0.2 µm) and made anaerobic by purging with 99.999% nitrogen. All transfers of water was conducted within an anaerobic chamber. Trichloroethylene (TCE) was added to the nitrogen-purged water to afford a 0.95 mg/L TCE solution. Four control vials were filled to capacity with 115 mL of this solution. There was no headspace in the filled vials. Iron(II) sulfate heptahydrate was added to the remaining solution to afford a 200 mM iron (II) sulfate/0.95 mg/L TCE solution. Four reaction vials were filled with 115 mL of this solution. There was no headspace in these vials. The pH of these solutions measured due to the buffering capacity of the clay. Measurement of pH was conducted using a Ross Sure-Flow pH combination electrode, standardized with pH 7 and 10 buffers.

The eight vials were capped with Teflon-lined septa, sealed with an aluminum crimp cap and the contents were mixed by rotation on a jar mill set at 35 rpm. All experiments were conducted at ambient temperature (approx. 25° C.)

After 1, 2, 3, 7 and 14 d, the vials were removed from the jar mill and were allowed to rest to allow the contents to settle. Aliquots (5.0 mL) of the aqueous solution were removed from the vials via gas-tight syringe as described in example 1 and were analyzed as described in example 1.

Results are tabulated below.

TABLE 3

Reductive Dechlorination of TCE
with Magnetite Amended with 200 mM Ferrous Sulfate

| time h | [TCE] mg/L | C/Co | ethane, ethene and ethyne as equiv. TCE | pH |
|---|---|---|---|---|
| 0 | 0.95 | 1.00 | — | 6.0 |
| 1 | 0.66 | 0.69 | 0.90 | 6.0 |
| 2 | 0.57 | 0.60 | 0.94 | 6.0 |
| 3 | 0.51 | 0.54 | 0.96 | 6.1 |
| 7 | 0.12 | 0.13 | 0.96 | 6.1 |
| 14 | 0.07 | 0.07 | 0.96 | 6.1 |

TABLE 4

Control Reactions with Magnetite
Demonstrating No Reaction in the Absence of Ferrous Sulfate

| time h | [TCE] mg/L | C/Co | ethane, ethene and ethyne as equiv. TCE | pH |
|---|---|---|---|---|
| 0 | 0.95 | 1.00 | — | 7.0 |
| 1 | 0.90 | 0.95 | n.d. | 7.0 |
| 2 | 0.90 | 0.95 | n.d. | 7.0 |
| 3 | 0.91 | 0.96 | n.d. | 7.0 |
| 7 | 0.90 | 0.95 | n.d. | 7.0 |
| 14 | 0.88 | 0.93 | n.d. | 7.0 | n.d.: nondetect by purge-and-trap GC-FID

EXAMPLE 3

Column Reaction with Fe(II)-Modified Soil

The following example illustrates the method by which a soil bearing iron(III) minerals may be amended with ferrous ion in a hydraulic flow system (column) resulting in a reactive media that reductively dechlorinates chlorinated solvents that pass through this prepared media. The source of ferrous ion in this example is from the reductive dissolution of magnetite, $Fe_3O_4$, by oxalic acid.

A 2×24 in. column containing 11 glass sampling ports spaced at 2 in. intervals along the length of the column was packed with the following materials (in order from bottom to top) 2.0 in. sand, 2.0 in. granular magnetite, 2.0 in. sand 12.5 in. soil and 5.5 in. sand. The magnetite and soil were separated by a 0.2 μm nylon filter to prevent the migration of magnetite into the soil and sand down gradient.

Before packing into the column, the soil was autoclaved three times at 120° C. and 15 lb. pressure for 3 h, allowing for a rest period of 24 h between each subsequent autoclaving. Approximately 1000 cc of soil was packed into the column. The column was capped with Teflon end caps connected to the ⅛ in. Teflon tubing. The direction of water flow was from the column bottom to the column top. A Teflon piston pump (Fluid Metering, Inc.; ceramic liner and piston) was used to pump water into the column at a set input flow rate.

Sampling of the column was performed at the sample ports fitted with Teflon septa and aluminum crimp caps into which 2 in. sample needles with luer-lock connector were placed. The needle tips at every sample port was permanently positioned into the center of the column. Two-way luer-lock connectors were attached to each needle. Sampling of the column was performed using gas-tight syringes that fitted directly to the luer-lock fittings at each port.

The column was saturated with Milli-Q deionized water, filter-sterilized (0.2 μm), by passing approx. 1 gallon of water through the column at a flow rate of 0.2 mL/min. A 200 mM solution of oxalic acid in Milli-Q deionized water was next introduced into the column. Over a 3 day period, 11.35 L of oxalic acid solution was introduced. A feed solution containing 50 mM oxalic acid and 6.4±1.2 mg/L trichloroethylene was next introduced into the column at a flow rate of 0.05 mL/min. Table 5 lists the averaged steady-state concentrations of TCE, cis-DCE and VC measured at each sample port over a period of 21 days.

TABLE 5

Averaged Steady-State Concentrations of TCE
and TCE Daughter Products Measured in a Soil Column
Treated with Ferrous Ion (Magnetite/Oxalic Acid);
Input Flow Rate was Set at 0.05 ml/min.

| column sample port | media | [TCE] mg/L | [cis-DCE] mg/L | [VC] mg/L | ethane, ethene and ethyne as equiv. TCE |
|---|---|---|---|---|---|
| feed | — | 6.4 | n.d. | n.d. | n.d. |
| 1 | magnetite | 5.8 | 0.6 | 0.1 | 0.05 |
| 2 | magnetite | 5.4 | 0.7 | 0.2 | 0.07 |
| 3 | sand | 5.0 | 0.7 | 0.2 | 0.19 |
| 4 | soil | 2.8 | 1.4 | 0.3 | 0.47 |
| 5 | soil | 2.4 | 1.5 | 0.3 | 0.51 |
| 6 | soil | 1.4 | 1.4 | 0.3 | 0.55 |
| 7 | soil | 1.0 | 1.3 | 0.3 | 0.75 |
| 8 | soil | 0.60 | 1.2 | 0.4 | 0.77 |
| 9 | soil | 0.08 | 0.9 | 0.4 | 0.78 |
| 10 | sand | 0.05 | 0.9 | 0.4 | 0.80 |
| 11 | sand | 0.05 | 0.9 | 0.3 | 0.75 |

What is claimed is:

1. A method of in-situ remediation of ground water contaminated with halogenated hydrocarbon compounds which comprises: forming a reactive zone comprising a ferrous ion modified clay or a ferrous ion modified ferric mineral in the path of a flowing plume of contaminated ground water allowing the contaminated ground water to pass through the reactive zone wherein reductive dehalogenation of the halogenated hydrocarbon compounds is achieved.

2. A method according to claim 1 in which the reactive zone is formed by introducing ferrous ions into subsurface clay-containing soil.

3. A method according to claim 2 in which ferrous ion is introduced by contacting the clay with an aqueous solution of a ferrous compound.

4. A process according to claim 1 in which the clay is selected form the group consisting of kandites, kaolinites, smectites, vermiculites, and chlorites.

5. A process according to claim 1 in which the ferric mineral is selected from the group consisting of magnetite, goethite, hematite, maghemite, ferihydrite, and lepidocricite.

6. A method for remediation of water contaminated with halogenated organic compounds which comprises passing the contaminated water through a reactive zone comprising a ferrous ion modified material selected from the group consisting of clay, ferric minerals and soils containing clay or ferric minerals wherein the reductive dehalogenation of the halogenated organic compounds is achieved.

7. A method according to claim 6 in which the contaminated water is remediated in situ by passage through a reactive zone formed in the soil by introducing ferrous ions into soil which contains clay or ferric minerals.

8. A method according to claim 6 in which the contaminated water is pumped from its source, passed through a reactive zone formed in a reactor vessel and returned to its source.

* * * * *